(12) United States Patent
Brewer

(10) Patent No.: US 10,060,464 B2
(45) Date of Patent: Aug. 28, 2018

(54) APPARATUS AND METHODS FOR PROVIDING A THREADED FIXING IN A CRUSHABLE OR BRITTLE MATERIAL

(71) Applicant: Avdel UK Limited, Hertfordshire (GB)

(72) Inventor: Jonathan Lee Brewer, Dunstable (GB)

(73) Assignee: AVDEL UK LIMITED (GB)

( * ) Notice: Subject to any disclaimer, the term of this patent is extended or adjusted under 35 U.S.C. 154(b) by 322 days.

(21) Appl. No.: 14/706,628

(22) Filed: May 7, 2015

(65) Prior Publication Data
US 2015/0322993 A1 Nov. 12, 2015

(30) Foreign Application Priority Data

May 9, 2014 (GB) .................................. 1408213.5

(51) Int. Cl.
| | |
|---|---|
| *F16B 21/18* | (2006.01) |
| *F16B 39/22* | (2006.01) |
| *F16B 37/12* | (2006.01) |
| *F16B 37/04* | (2006.01) |
| *F16B 11/00* | (2006.01) |

(52) U.S. Cl.
CPC .......... *F16B 39/225* (2013.01); *F16B 37/048* (2013.01); *F16B 37/12* (2013.01); *F16B 11/006* (2013.01)

(58) Field of Classification Search
CPC ...... F16B 39/225; F16B 37/048; F16B 37/12; F16B 11/006
USPC ....................................................... 411/353
See application file for complete search history.

(56) References Cited

U.S. PATENT DOCUMENTS

| | | | | |
|---|---|---|---|---|
| 2,700,172 | A | * | 1/1955 | Rohe ......................... F16B 5/01 16/2.1 |
| 2,967,593 | A | * | 1/1961 | Cushman .................. F16B 5/01 16/2.1 |
| 3,252,493 | A | * | 5/1966 | Smith ....................... F16B 5/01 285/222 |
| 4,296,586 | A | * | 10/1981 | Heurteux .................. F16B 5/01 411/338 |
| 4,778,702 | A | | 10/1988 | Hutter, III |
| 4,948,316 | A | * | 8/1990 | Duran .................. F16B 5/0208 411/107 |
| 4,952,107 | A | * | 8/1990 | Dupree ................. F16B 5/0208 411/103 |
| 4,981,735 | A | * | 1/1991 | Rickson .................... F16B 5/01 156/92 |

(Continued)

FOREIGN PATENT DOCUMENTS

| | | |
|---|---|---|
| DE | 3832602 | 3/1990 |
| EP | 2584208 | 4/2014 |
| GB | 2477550 | 8/2011 |

*Primary Examiner* — Gary Wayne Estremsky
(74) *Attorney, Agent, or Firm* — Kofi A. Schulterbrandt; Michael P. Leary

(57) ABSTRACT

A threaded fastener for installation in an aperture in a workpiece, the fastener having a rear portion defining an internally threaded aperture and a front portion arranged to engage the rear portion and having a front aperture which is aligned with the threaded aperture when the two portions are fully engaged, both portions having bearing surfaces for bearing on the rear and front of a workpiece respectively and the engagement between the portions being arranged to accurately control the distance between the front and rear bearing faces.

12 Claims, 12 Drawing Sheets

(56) References Cited

U.S. PATENT DOCUMENTS

| | | | | |
|---|---|---|---|---|
| 4,987,511 | A * | 1/1991 | Hopkinson | H01T 4/08 361/126 |
| 5,106,249 | A * | 4/1992 | Janotik | B62D 29/048 403/388 |
| 5,704,747 | A | 1/1998 | Hutter, III | |
| 5,950,277 | A * | 9/1999 | Tallmadge | F16B 5/0258 16/2.1 |
| 6,328,513 | B1 * | 12/2001 | Niwa | F16F 1/362 16/2.1 |
| 6,488,460 | B1 * | 12/2002 | Smith | F16B 5/01 411/339 |
| 6,773,780 | B2 | 8/2004 | Hutter, III | |
| 6,860,689 | B1 * | 3/2005 | Attanasio | B64C 1/12 411/353 |
| 6,932,044 | B1 * | 8/2005 | Fenech | F01M 11/0004 123/195 C |
| 7,555,818 | B2 * | 7/2009 | Erskine | E04F 13/0835 24/305 |
| 7,699,568 | B2 * | 4/2010 | Sugiyama | F16B 5/02 411/353 |
| 8,128,308 | B2 * | 3/2012 | Skinner | B23P 9/025 29/507 |
| 8,297,169 | B2 * | 10/2012 | Kunda | F16B 5/025 411/108 |
| 8,777,537 | B2 | 7/2014 | Fritsch | |

\* cited by examiner

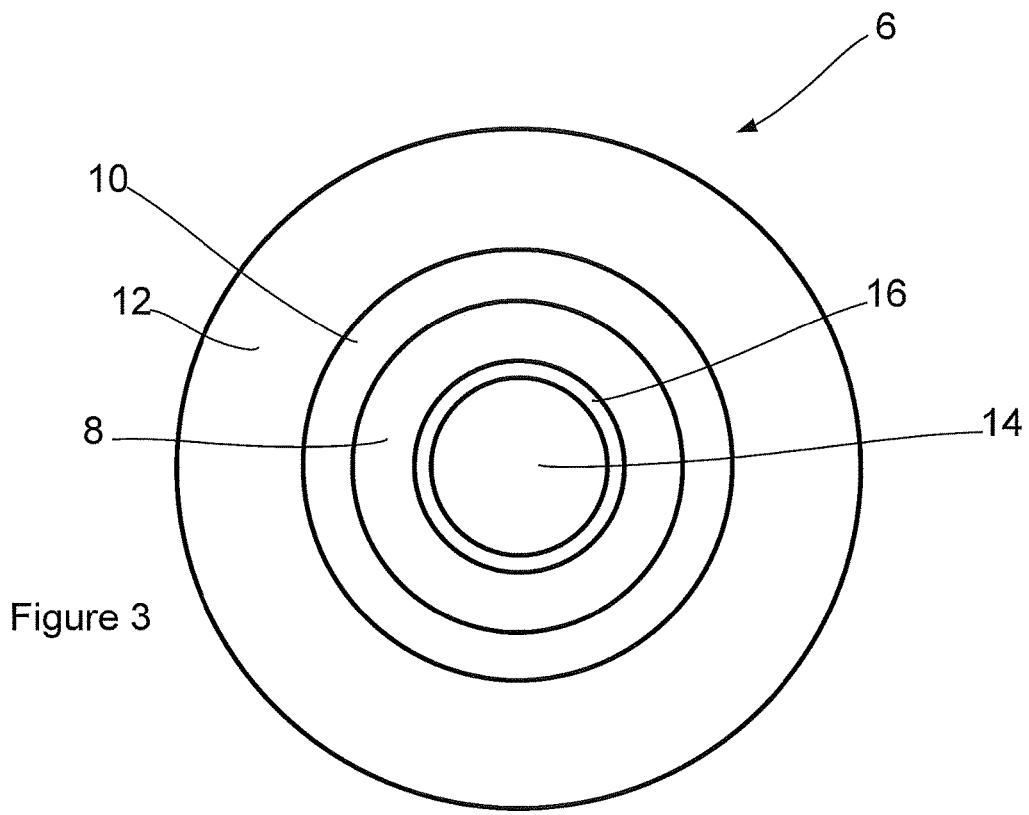
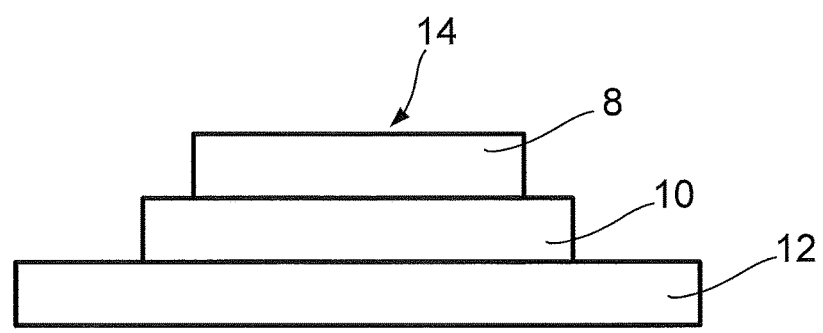
Figure 3
Figure 4

APPARATUS AND METHODS FOR PROVIDING A THREADED FIXING IN A CRUSHABLE OR BRITTLE MATERIAL

CROSS-REFERENCE TO RELATED APPLICATIONS

This application claims priority from United Kingdom Patent Application No. GB1408213.5, filed May 9, 2014, the disclosure of which is incorporated herein by reference in its entirety.

FIELD OF THE INVENTION

This invention relates to a threaded fastener for installation in an aperture formed in a crushable panel.

BACKGROUND OF THE INVENTION

Lightweight vehicle structures are now being developed in which larger components are being made from Carbon Fibre Reinforced Plastic (CFRP) and other composite materials such as glass-filled thermoplastics. There is a need to provide robust, load-bearing threaded connections between these composite components and also to other parts of the vehicle which may be made of other materials, typically metal.

Self-tapping screws may be used to provide load bearing interconnections, but it is generally not desirable to drive such screws directly into such composite materials due to their low strength and the delamination damage caused by the penetration of screw thread crests into the fibre reinforced material. Such delamination then undesirably reduces the strength and may damage the appearance, of the composite material. Similarly, conventional press fit threaded inserts or studs with engaging splines and knurls are undesirable as the penetration of the composite by the sharp edges of the splines or knurls cause delamination of the CFRP material.

Alternatively a flanged, threaded metal nut or stud may be moulded within the composite material, during layering of the composite material in manufacture, which in turn serves as a connection with a mating screw, bolt or nut. These fasteners provide releasable connection of composite components to other components. However such moulded-in inserts require a time consuming, high-skill-level assembly process and may require complex and expensive-to-make mould tools to accommodate the metal insert. Additionally ingress of molten plastic or resin into the thread form of the fastener may be difficult to avoid.

Other fastening options to provide a threaded metal fastener on a composite structure include studs and nuts bonded onto the panel surface using adhesive or other mechanical fastening means such as that described in U.S. Pat. Nos. 6,773,780-A, 4,778,702-A or 5,704,747-A which describe a surface mounted, adhesive bonded threaded stud and nut respectively U.S. Pat. No. 5,704,747-A in particular requires a separate flaring step to flare the edge of a liner sleeve to hold the fastener in place at least during adhesive curing. In addition to delayed assembly times, these components are complex to assemble. Such bonded fasteners will easily move within the panel until the adhesive has cured, thus making handling difficult or impossible until the adhesive cures adequately. This then increases manufacturing costs through delay and increased storage requirements for stock during manufacture. Furthermore, the strength of the completed fixing is limited by the bond strength of the adhesive and the delamination strength of the panel itself. Additionally, adhesives are well known for having relatively low peel resistance thus limiting bending resistance in a purely adhesive-bonded configuration.

US 2009/0169324-A discloses a fastener designed to couple thin-walled structures together. The fastener comprises a male portion with an external screwthread for mating with a corresponding internal screwthread of a female portion in order to clamp the walled structure therebetween. However, it is said that shear load across a threaded fastener, such as the male portion, results in stress risers across the threads. This can cause the fastener to fail. So this disclosure teaches use of a sleeve between the male and female portions to serve as a shear bush in order to absorb shear load and obviate thread failure. The only coupling together in this fastener is between the male and female portions, not the sleeve and that coupling is by way of screwthread engagement.

GB 2,477,550-A discloses a fixing insert to provide a threaded bore in a plate. The insert is formed in two halves, one male and one female which are coupled together across the plate via screwthread engagement. The force with which the two fastener halves apply compression to the sandwiched plate depends on how much torque is applied to their screwthread engagement. There is no disclosed means for controlling the axial separation of the two fastener halves.

BRIEF SUMMARY OF THE INVENTION

It is an object of the invention to at least alleviate the problems associated with the prior art and to decrease the assembly time and difficulty of assembly. This reduces overall assembly time and cost and requires less operator skill. Additionally the new design is simplified in comparison with conventional threaded bushings, etc. with the removal of assembly threads and drive features to reduce component manufacturing cost.

According to a first aspect of the present invention, there is provided a threaded fastener for installation in an aperture in a workpiece, the fastener having first and second portions, which first and second portions are arranged to engage non-removably along a common axis, the common axis defined by the aperture in the workpiece;
one of the first and second portions having an axially-extending aperture of first diameter and the other of the first and second portions having an axially-extending aperture of differing diameter to that of the one of the first and second portions;
the first and second portions engaging with each other along the common axis in an interference fit between the aperture of first diameter and the aperture of differing diameter;
wherein both the first and second portions have respective bearing surfaces (24, 26) for bearing on the front and rear surfaces, respectively, of the workpiece;
the threaded fastener characterised in that the axial separation of the bearing surfaces of the first and second portions, when engaged with each other, is predetermined by the axial extent of at least one shoulder formed on either, or both, of the first and second portions, the at least one shoulder situated between the respective bearing surfaces of the first and second portions. Provision of a shoulder for enabling accurate separation of the two fastener portions obviates the potential for crushing the workpiece.

In a further aspect, the invention provides a method of installing a fastener into a workpiece, the method comprising:

i) placing the one of the first and second portions into an aperture in the workpiece;
ii) fitting the other of the first and second portions to an installation tool;
iii) engaging a drivescrew of the installation tool with the thread of the one of the first and second portions; and
iv) axially moving the drivescrew to draw the one of the first and second portions towards the other of the first and second portions so that the two portions become engaged.

BRIEF DESCRIPTION OF THE DRAWINGS

Embodiments of the invention will now be described, by way of example, with reference to the drawings in which:

FIG. 3 is a plan view of a nut in accordance with the invention;
FIG. 4 is a side elevation of the nut of FIG. 3.

DETAILED DESCRIPTION OF THE INVENTION

Figure 1:
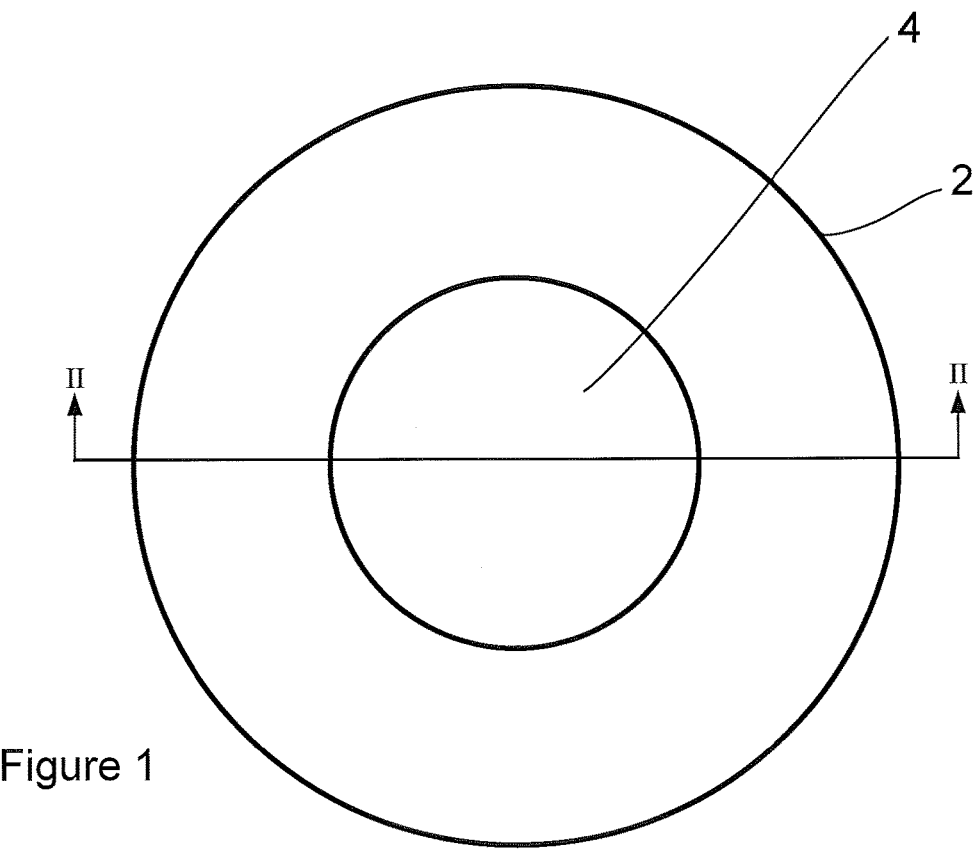
FIG. 1 is a plan view of a washer in accordance with the invention.
Figure 2:
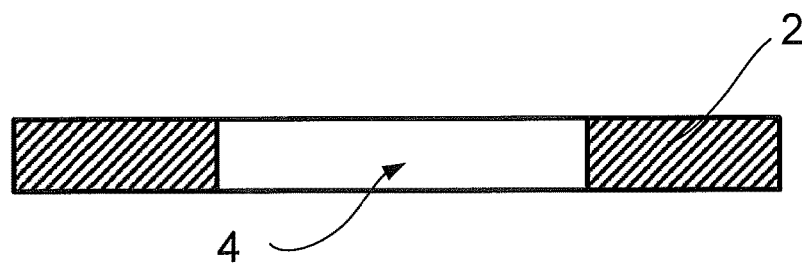
FIG. 2 is a section along a line II-II of FIG. 1.

With reference to FIG. 1, a washer 2 having an aperture or bore 4 is dimensioned and arranged to be an interference fit with a nut 6 as shown in FIGS. 3 and 4. The nut has a spigot 8 which is intended to be an interference fit in the aperture 4. Below the spigot 8 is a shoulder 10, which is described in more detail below, and a nut head 12. The nut 6 also has an aperture 14 formed with an internal thread 16.

Figure 5:
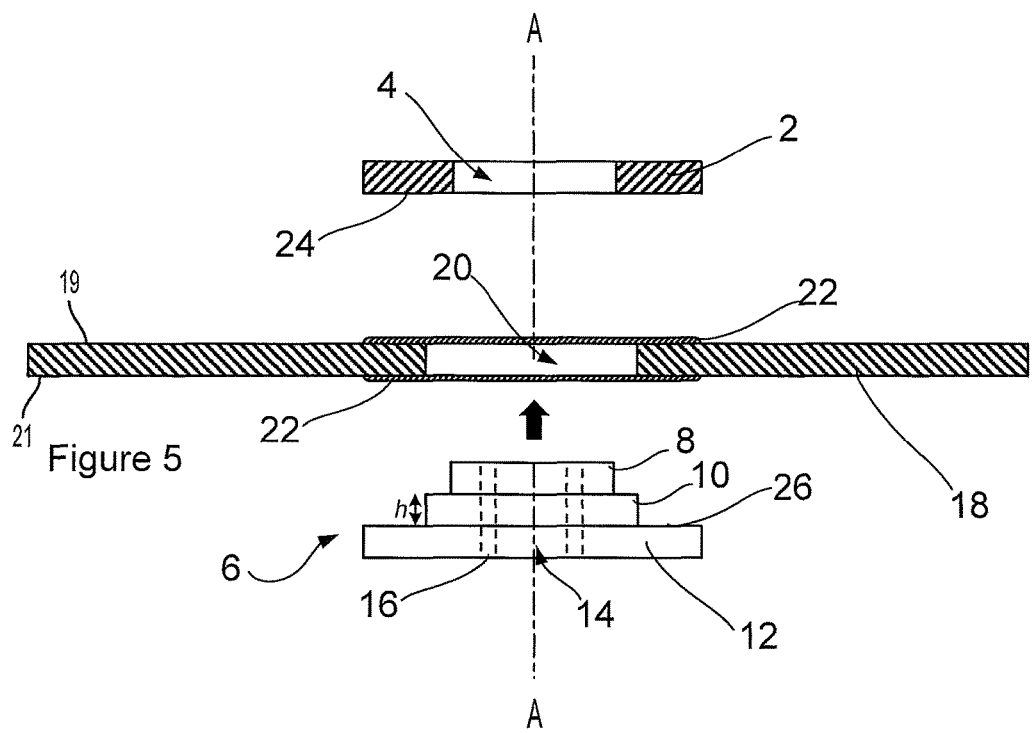
FIG. 5 is a partial section showing a nut and washer ready for assembly into a crushable panel.
Figure 6:
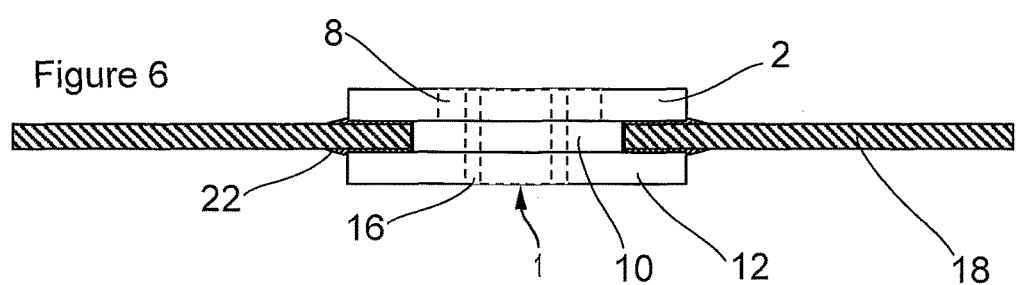
FIG. 6 shows the assembled fastener.

With reference to FIGS. 5 and 6, the nut 6 and washer 2 form a combination fastener 1 which is intended to be installed into a crushable panel or workpiece 18 having a pre-formed aperture 20, defining an axis A-A through which axis the fastener is assembled. Prior to assembly the panel may be loaded with adhesive 22 around, and possibly inside, the aperture 20. Alternatively, the adhesive may be pre-applied to the nut and/or washer components. A heat-curable adhesive in a solidified, uncured form on the components is particularly suitable for this since it allows easy handling of the fastener components. The adhesive may then be cured by heating of the whole panel after fastener installation. A 2-part epoxy resin may be suitable for this application.

To install the fastener into the panel 18, the nut 6 is passed through the aperture 20 along the axis A-A on what will become the rear 21 of the panel, with the front of the panel being shown at 19. The shoulder 10 has a diameter which fits within the aperture 20 and typically fits reasonably accurately in the aperture so that the fastener is centralised in the aperture but without excessive rubbing. Thus it is dimensioned to be a loose fit in the hole but without permitting excessive radial movement within the aperture 20.

The height h of the shoulder 10 is typically chosen to be slightly thicker than the thickness of the panel 18. This then allows the adhesive 22 to have a controllable space within which to flow, and subsequently to cure, since the height h of the shoulder 10 controls the assembled distance between the inner surface 24 of the washer 2 and the inner surface of the nut head 26. The difference between h and the panel thickness would typically be 0.3 mm, thus allowing for an adhesive "bondline" thickness of 0.15 mm for optimal strength securing the washer and nut flange respectively. But the value of h may be different and may, for example, be less than the panel thickness.

Thus control of the height h relative to the thickness of the panel 18 allows space for adhesive, a flush fit without space for adhesive, or indeed gentle compression of the panel 18 which may, for example, be a suitable option for resilient panel materials. The general concept of choosing an appropriate height h in relation to the thickness of the panel 18 is to ensure that once installed, the fastener is sufficiently secure in the panel 18 to allow handling of the panel. In the case of a panel of resilient material such as a thermoplastics material, the height h may be set below the thickness of the panel material so that the material is compressed after fastener installation. The reaction forces exerted against the surfaces 24 and 26 by the panel 18 then help keep the fastener in place and may obviate a need for adhesive.

The interference fit between the spigot 8 and the edge of the aperture 4 may be sufficient to allow immediate handling. However, features or dimensions which allow a strong resistance to separation of the parts may require unacceptably high forces to be applied to bring the washer 2 and nut 6 together (typically the assembly force will be chosen to be less than 20 kN). In this case adhesives or resilient features of the panel 18 itself may be suitable supplements to the interference fit of the nut and washer alone, and thus allow reduced installation forces to be used.

Figure 7:
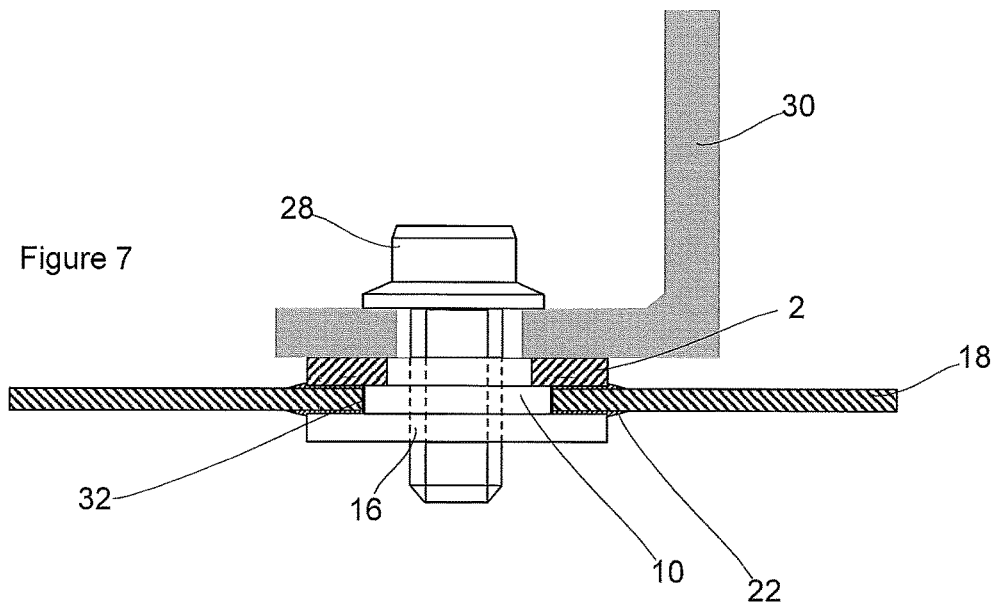
FIG. 7 shows a part fastened to the crushable panel using an assembled fastener.

With reference to FIG. 7, once the fastener has been installed, a conventional bolt 28 may be passed through the aperture 14 and engage with the thread 16 in order to secure a part 30 to the panel 18.

It will be noted that the fastener's strength derives from the clamp load between the washer 2 and the nut head 12. The load is applied by axial compression derived from the thread 16 during application of tightening torque to the bolt 28. The dimensional control which avoids crushing of the panel is achieved by controlling height h of the shoulder 10.

Shoulder 10 may also have other functions. For applications involving metal components in CFRP structures it is known that the direct contact of metal with the carbon fibres is undesirable as this increases the risk of galvanic corrosion of the metal. An option therefore would be to provide the outer diameter of the shoulder 10 with a sleeve made of a non-metallic material such as nylon or an elastomer to isolate the metal from the exposed carbon fibres of the hole in the panel. This sleeve may also be configured to help retain the nut 6 positively in the panel prior to applying the washer 2, via barbs or spring clip features. (Note: the nut flange and washer inner faces are typically held off the CFRP by the adhesive.). Furthermore this area 32 between the inner edge of the panel aperture 20 and the outer circumference of the shoulder 10, may be dimensioned to allow adhesive to flow into that space, which further increases the bond surface area and therefore bond strength of the adhesive.

Thus this arrangement requires relatively simple preassembly, and allows early handling of the panel without the complexities of the prior art. By spreading the load on the panel using the relatively large surface area of the washer 2 and the nut head 12, very strong fastenings may be made to panels such as CFRP which are brittle and thus can fail through fracture when high loads are applied to relatively small surface areas.

Figure 8:
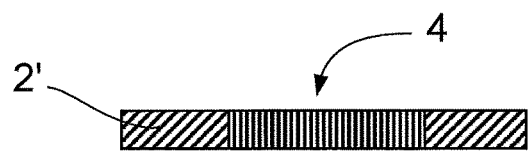
FIG. 8 shows a section through an alternative washer.

In the above embodiment, the washer and nut configurations have generally been circular and the engaging surfaces of the washer bore and spigot outer diameter have been plain (smooth). Alternatives for this surface are splined, knurled, serrated or featuring annular grooves. It will be appreciated that these configurations are not limiting, for example with reference to FIG. 8, the washer 2' may have internal ridges formed in the aperture 4', such as generally axial splines. Features such as raised rings, dimples, radial or circumferential grooves or a rough, textured surface may be provided on the faces of nut flange 26 and/or washer 24 to enhance adhesive bond strength or to grip onto the panel surfaces directly.

Figure 9:
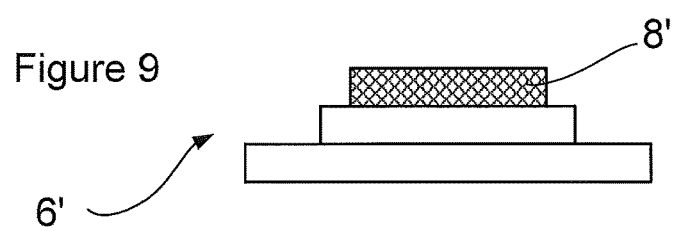
FIG. 9 shows a side view of an alternative nut.

Similarly, and with reference to FIG. 9, the spigot 8' may have knurled formations. These all help to create a high quality interference fit between the spigot and the aperture 4 without excessive insulation forces being required. For example, in the case of knurling or splines, typically these features will deform through cold forming during installation and as a result of high surface pressures on the relatively small surface area features. These features are generally also easy to form in the components as they are manufactured and may provide installation advantages.

Figure 10:
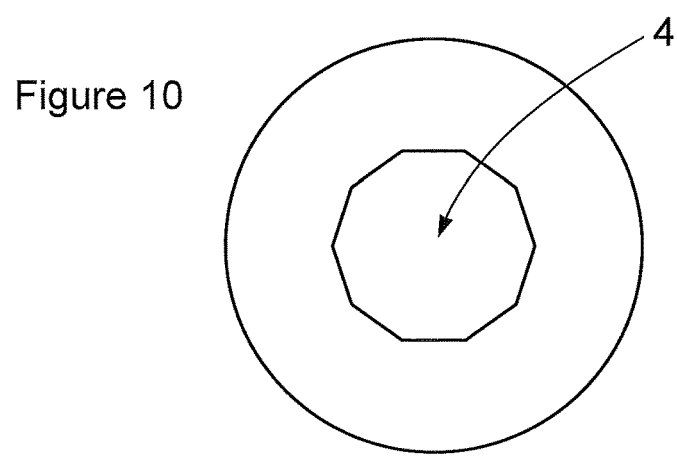
FIG. 10 shows an alternative washer having a polygonal aperture.

With reference to FIG. 10, the aperture 4 in the washer may have a polygonal shape or simply non-round shape. This may have arcuate sides forming lobes or straight sides, or any combination between the two. One example is a trilobular shape. With slight differences in dimensioning between the aperture 4 and a corresponding shape formed on the nut spigot 8, an interference fit may readily be achieved.

Figure 11:
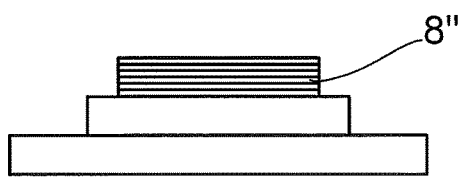
FIG. 11 shows an alternative nut.

FIG. 11 shows a further alternative with a nut having generally circumferential splines or barbed configurations formed on the spigot 8". In the case of barbs, these are formed having splines with an axially inclined outer surface in which the diameter of the splines is lower and gradually increases so that the spigot slides relatively easily into the washer aperture 4 but tends to dig in to the inner surface of the aperture 4 if the nut and washer undergo forces trying to induce their separation.

It will be noted that the interference fit between the nut and the washer is generally only required to allow handling of the panel or to allow the parts to remain in place during adhesive curing. These features are not required to provide for the strength of the finally used fastener, since that is produced by the clamp load applied by the bolt 28. Thus the designer is free to choose appropriate formations between the spigot 8 and the washer aperture 4 which provides sufficient interaction between the two parts prior to handling, and depending on the handling environment and materials used.

Figure 12:
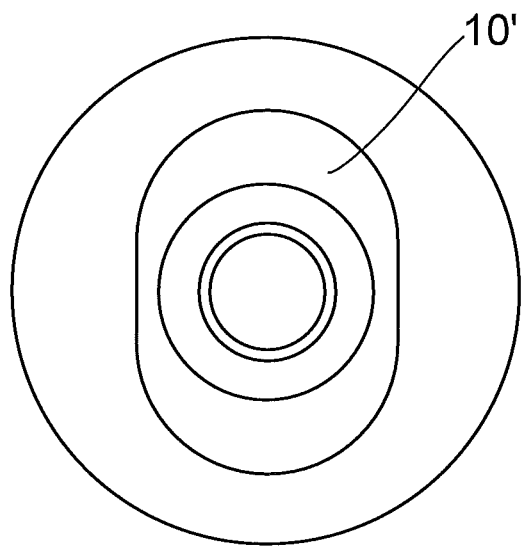
FIG. 12 shows a plan view of a further alternative nut.
Figure 13:
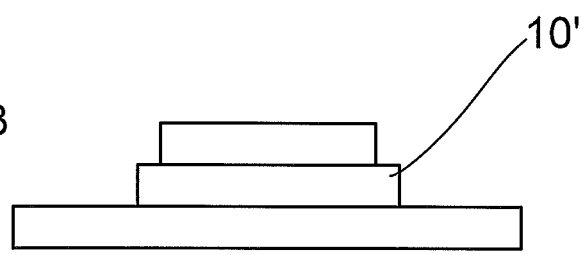
FIG. 13 shows a side view of the nut of FIG. 12.

FIG. 12 shows an alternative nut in which the shoulder 10' has an elongate formation. This may fit in a similarly elongate panel aperture 20. Such a panel aperture is relatively easy to produce since, typically in materials such as CFRP, holes are produced using milling tools to avoid damage to the embedded fibres, and such a milling tool is readily able to traverse a path to produce a slot. The advantage of using a shoulder of this shape is that rotational torque of the fastener during insertion of a bolt 28 is naturally resisted by reaction forces produced between the elongate spigot 10 and the elongate panel aperture 20. This then allows the bond strength of the adhesive 22 to be chosen to be lower, or to allow a relatively large diameter bolt 28, or a bolt with a prevailing-torque thread form such as POWERLOK ®, to be used which may generate greater rotational torque, applied to the thread 16, during their insertion. This then even better prevents spinning of the fastener within the panel during insertion of the bolt 28.

Figure 14:
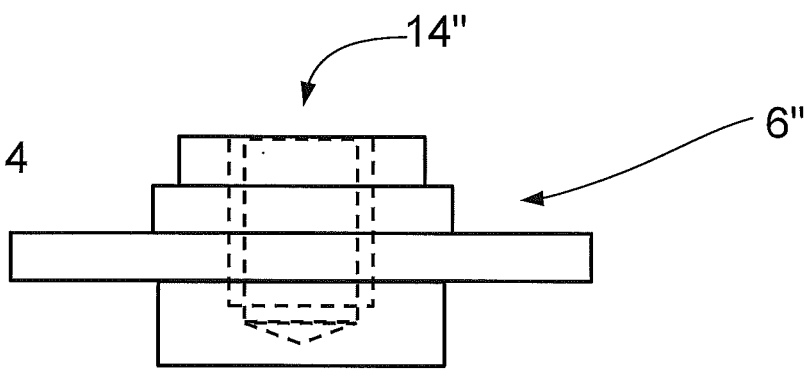
FIG. 14 shows a further alternative nut.

FIG. 14 shows a further alternative nut 6" having a blind aperture 14" which then provides a watertight or fluid tight fastener and effectively seals the aperture 20 formed in the panel 18.

Figure 15:
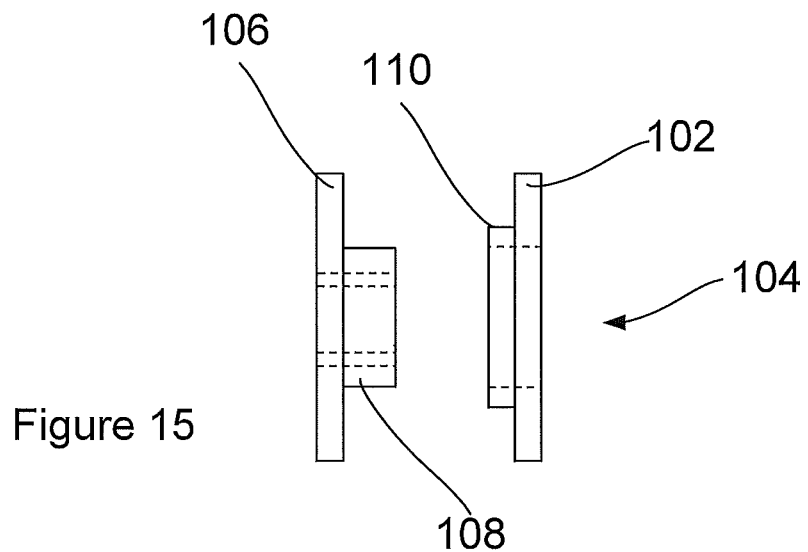
FIG. 15 shows an alternative nut and washer combination.
Figure 16:
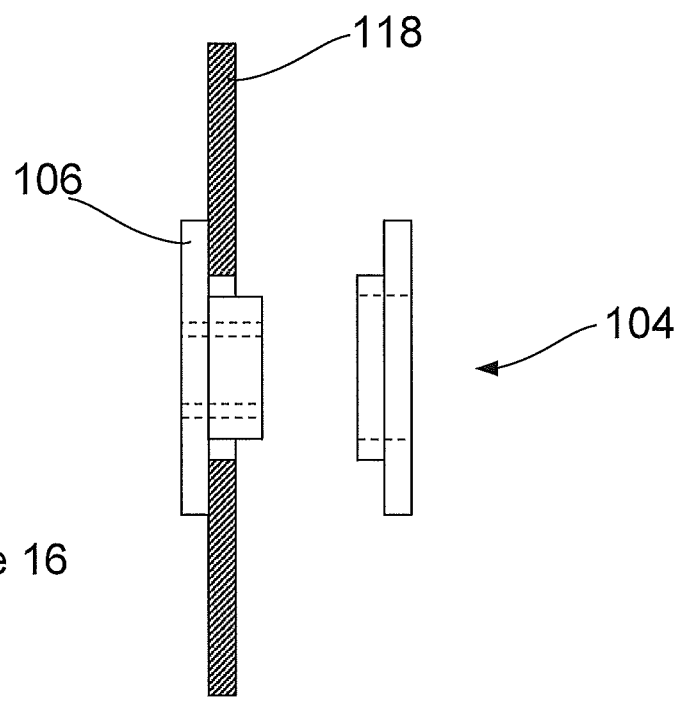
FIG. 16 shows a partially installed nut and washer combination as shown in FIG. 15.

With reference to FIGS. 15 and 16, it will be noted that what is presently considered to be the best mode has just been described. However, an alternative construction in which features are swapped between the washer and nut of the earlier embodiment is feasible. Thus, FIG. 15 shows a nut 106 and a washer 102 with the shoulder 110 formed on the washer rather than the nut. A spigot 108 is still arranged to be an interference fit into an aperture 104 formed in the washer 102. FIG. 16 shows this arrangement partially assembled to a panel 118.

Figure 17:
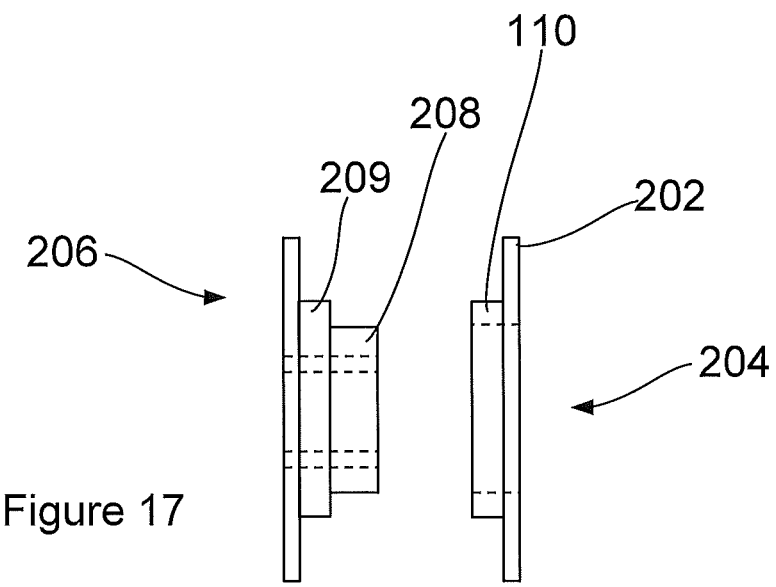
FIG. 17 shows a further alternative nut and washer combination.
Figure 18:
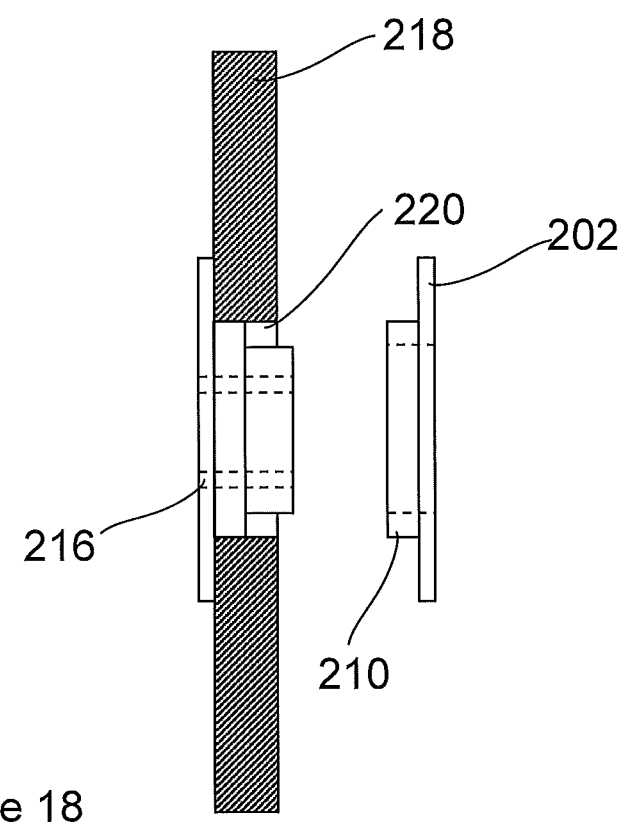
FIG. 18 shows a partially installed nut and washer combination as shown in FIG. 17.
Figure 19:
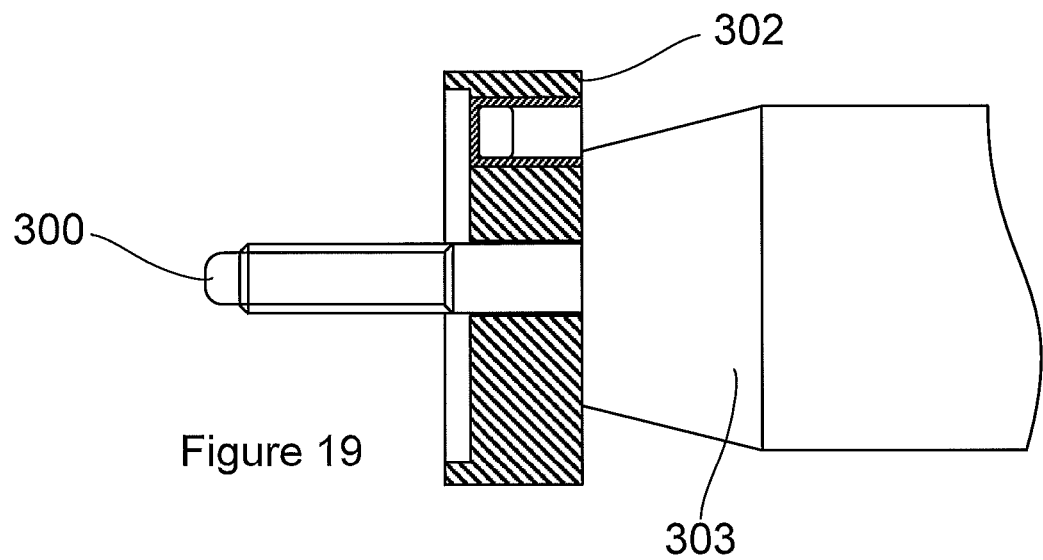
FIG. 19 shows a partial cross-section of a pulling tool.

FIGS. 17 and 18 show a further development of this arrangement in which the nut 206 has an additional shoulder 209 of similar dimensions to the shoulder on the washer 210.

This allows the nut to be centralised in an aperture 220 in a panel 218. This helps with assembly and avoids the need to hold the nut 206 central in the hole in embodiment shown in FIGS. 15 and 16.

This also allows a thin washer 202 to be created and the shoulder 210 could then be formed using an extrusion or cold forming process. In this way the engagement with the spigot 208 is still sufficient to allow the interference fit advantages described above, prior to a bolt being passed into the threaded portion of the nut 216. This arrangement is particularly suitable for low-profile installations in which the low height of the washer 202 above the panel surface is advantageous.

Figure 26:
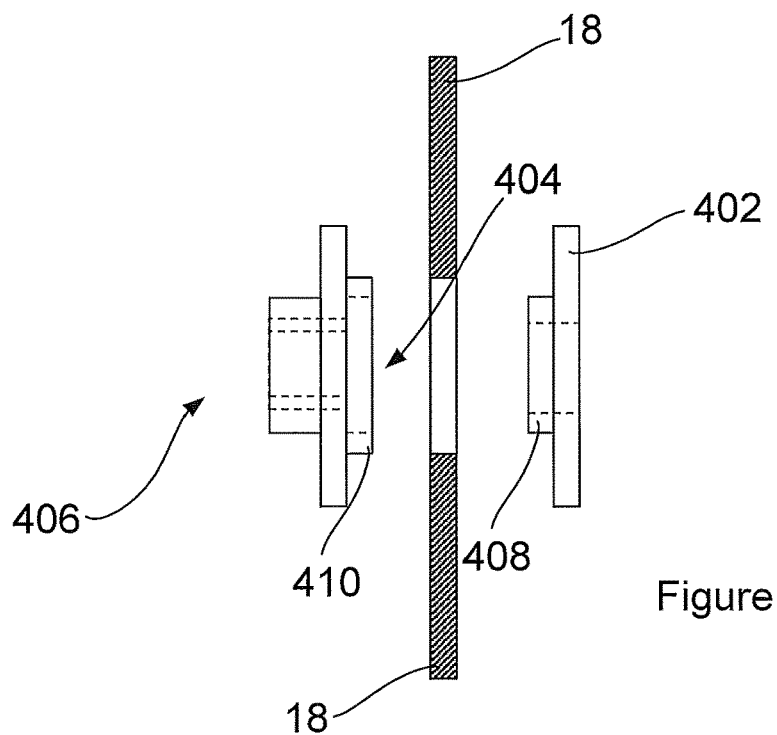
FIG. 26 shows a section of a further alternative fastener.

As a further alternative, the spigot 8 described above may instead be located on the washer portion. Thus with reference to FIG. 26, a spigot 408 is formed on a washer 402 which cooperates with a bore 404 formed in a nut 406. The nut has a shoulder 410 which operates in the same way as the shoulder 10 described above on the other embodiments. Thus apart from the reversal of the positions of the spigot 408 and bore 404, this configuration operates and performs in a similar way to the previously described embodiments and like parts are therefore not described again.

Installation Process

With reference now to FIGS. 19 to 25, the installation process will now be described. A pulling tool has a drive-screw formed as a threaded shaft 300 and an anvil, or nose tip 302 and the installation may take place with the tool on only one side of the panel 18. Only the nose tip case 303 of the tool is shown and the skilled person will understand that the whole tool typically will have a handle and trigger arrangement for activation and a source of power to drive the shaft 300. The tool is able to spin the shaft 300 in order to engage with the thread 16 of the nut described above. Preferably the shaft 300 has a dog-point which aids engagement of the shaft within the thread 16 and helps avoid cross-threading. The tool is also able to pull the shaft in a direction which pulls the nut towards the anvil 302 and once installation of the nut and washer combination is complete, is able to reverse the direction of the shaft 300 in order to spin the tool off the completed installation. Once the shaft 300 is engaged with the thread, the shaft is retracted into the tool and completion of installation may be indicated either by a preset stroke or a preset pulling force which is detected automatically by the tool. Pulling to a pre-set force is preferred as it accounts for dimensional variation in the mating fastener parts.

Figure 20:
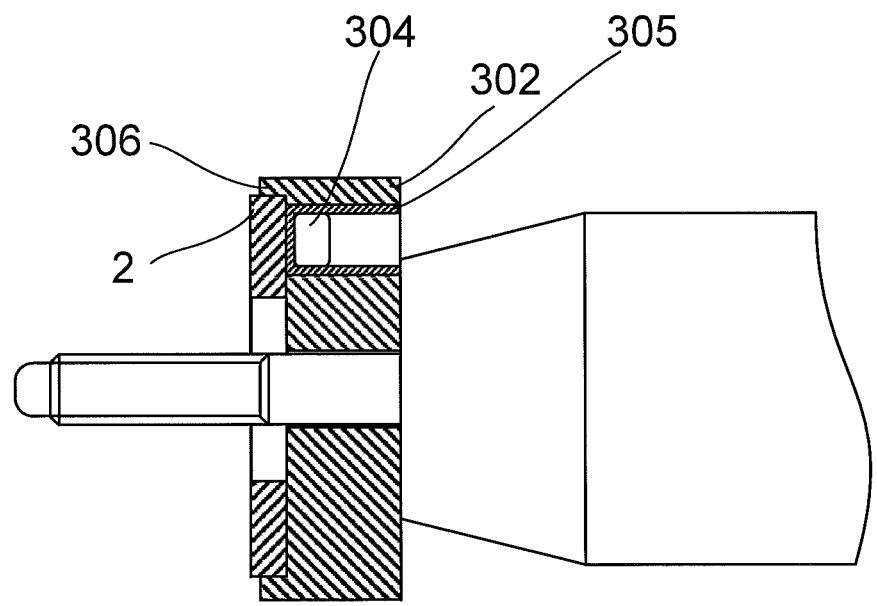
FIG. 20 shows a first step of installation using a pulling tool.

With particular reference to FIG. 20, the anvil 302 may have a magnet 304 or a plurality of magnets spaced generally around the anvil, which are typically a press-fit in a plastic, preferably nylon, sleeve 305. These magnets then allow holding of a ferrous washer 2, prior to installation. Alternatives to a magnet are vacuum ports or a spring biased retaining feature such as a spring clip, on the anvil. The anvil may have a generally annular collar 306 near or on its periphery, to help centralise the washer 2, on the anvil. This then helps to centralise and align the spigot 8 and washer bore 4. Although shown as a continuous annular feature, this may instead take the form of a toothed or castellated feature with gaps or any other lip feature which engages the washer to locate and position it in a repeatable way relative to the shaft.

In the case of using an adhesive 22, typically the uncured adhesive will help hold the nut flange 12 onto the rear surface 21 of the panel 18 immediately upon insertion of the shoulder 10 into the hole 20. This effectively holds the nut in place and prevents movement or rotation of the nut as the placing tool shaft 300 is fitted during washer assembly. Dependent upon the strength of adhesion available, the nut may not need manual support at the rear 21 of the panel 18 during assembly of the washer, thus improving the ergonomics and speed of the fastening process as a whole.

Figure 21:
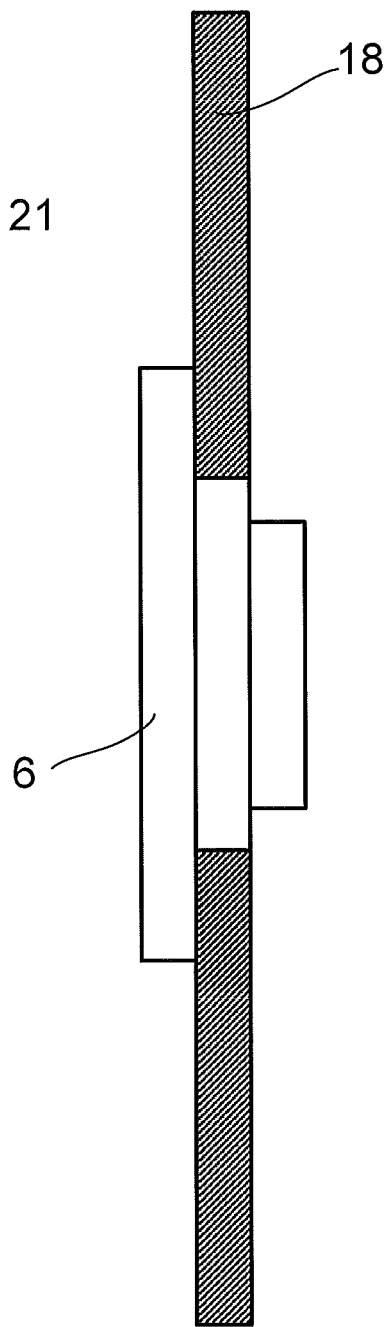
FIG. 21 shows a second step of installation using a pulling tool.
Figure 22:
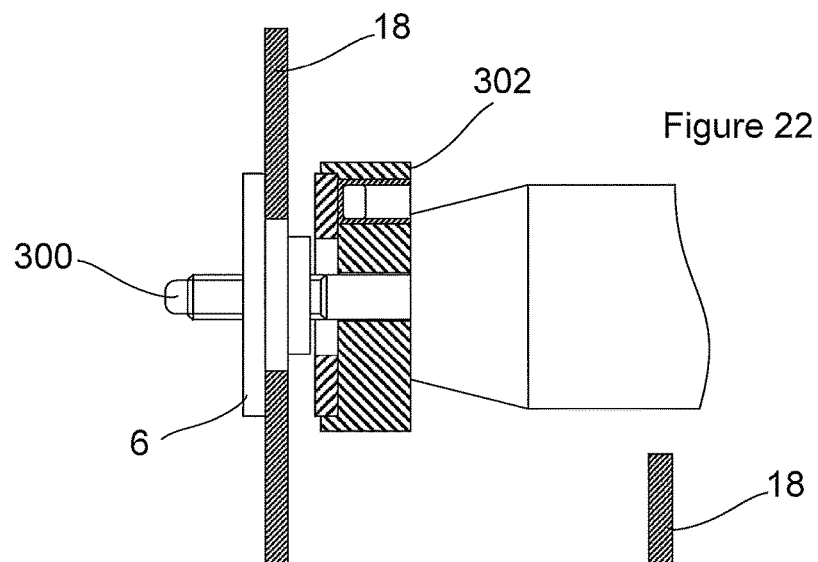
FIG. 22 shows a third step of installation using a pulling tool.
Figure 23:
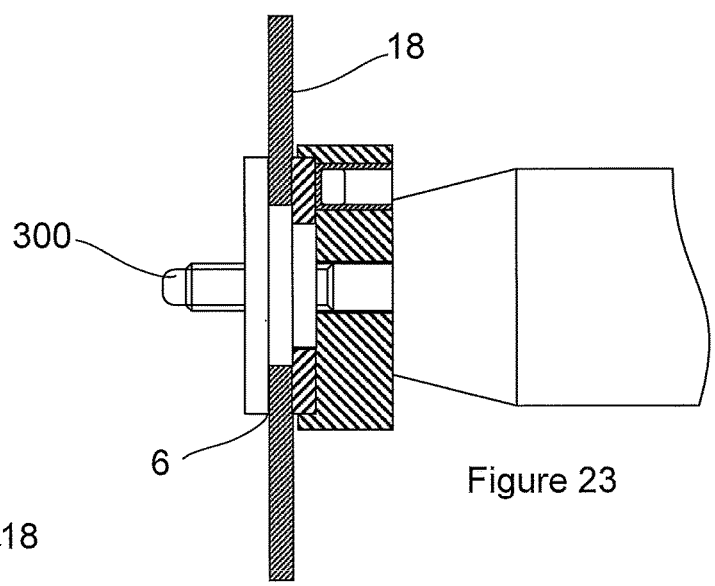
FIG. 23 shows a fourth step of installation using a pulling tool.

FIG. 21 shows the nut inserted in the panel 18 which is typically a crushable panel. The shaft 300 of the tool is then inserted into the nut as shown in FIG. 22 and the nut is then pulled into the washer as shown in FIG. 23. Once the spigot contacts the washer, the pulling of the shaft ceases automatically (by virtue of a known length of pull-stroke or a pre-set pulling force being reached). This then completes installation of the fastener; the pulling of the shaft 300 against the anvil 302 bringing the two parts together in order to provide the interference fit described above.

Figure 24:
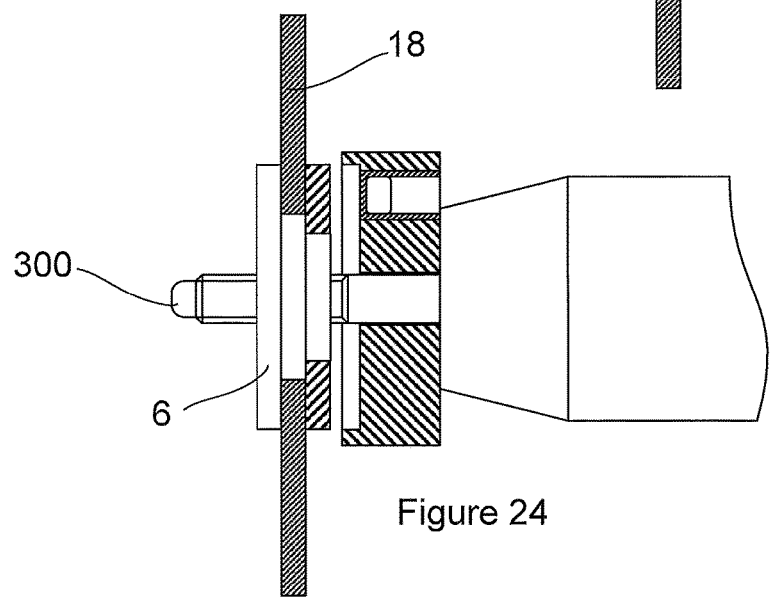
FIG. 24 shows a fifth step of installation using a pulling tool.

Once this step is complete, the shaft 300 is withdrawn from the nut as shown in FIG. 24. Once the shaft is withdrawn, assembly of the nut and washer is complete.

Figure 25:
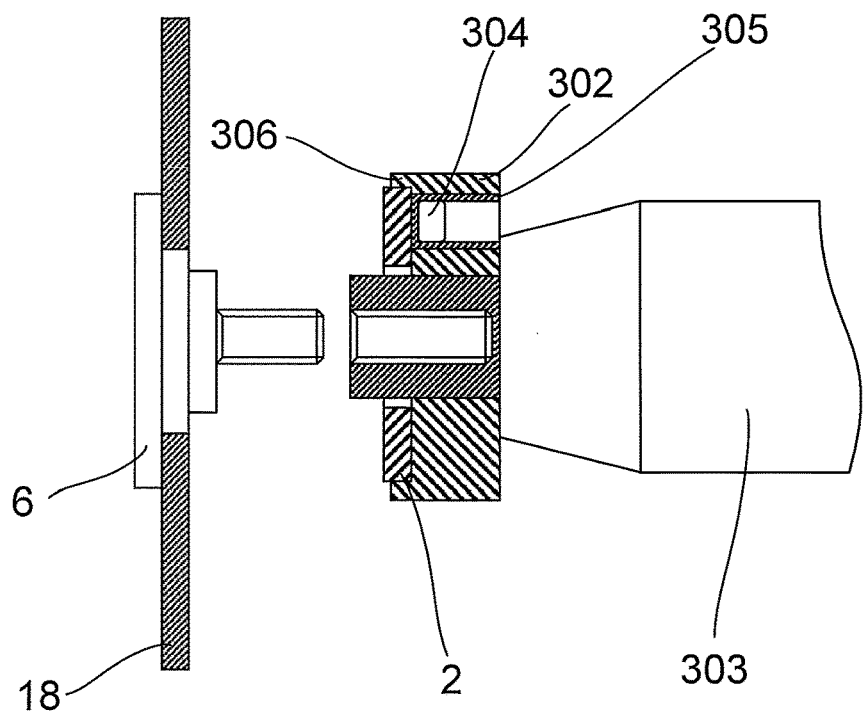
FIG. 25 shows an alternative fastener configuration with corresponding placing tool nose.

FIG. 25 shows an alternative form of "nut" in which the internally threaded bore 16 is replace with an externally threaded stud 16'. Other components and operations are similar to those described above, and have been numbered accordingly in the Figure. This arrangement is suitable for installations which require fixing of a stud to the panel 18, rather than provision of a threaded hole.

In this case, the tool nose is suitably modified to accommodate this alteration by the provision of an internally threaded tip 300' which engages with the stud 16' in a similar way to the threaded bore 6 and shaft 300 described above. Once engaged, the tool operates in a similar manner to that described above with a spin on, pull, spin-off sequence.

The preferred installation method typically uses a well proven type of power tool which is commonly available for fitting blind threaded inserts such as an Avdel 74200 or 74201 hydro-pneumatic unit; the former pulls to a pre-set stroke while the latter pulls to a pre-set pull-force and either options is possible with this fastener. However pulling to a pre-set force is preferred as it accounts for dimensional variation in the mating parts, etc. The tool is quick and easy to operate and set up. No checking of assembly torque is necessary and visual inspection of the placed assembly is easy and quick.

In summary, typical assembly steps would be:
1. Apply adhesive to periphery of the hole and possibly the bore surface in the panel.
2. Insert nut (from the rear of panel).
3. Fit washer into nose of placing tool (the washer may be retained in the tool nose by mechanical spring, magnet, or vacuum).
4. Engage drivescrew of tool into nut internal thread (from front of panel).
5. Apply light end-load to placing tool—this activates the powered spin-on of the drivescrew 300 to engage fully in the nut thread 16. (Support of the nut at the rear can be removed completely now.)
6. Pull tool trigger to activate setting stroke which forces bore of washer over the spigot end 8 of the nut. (Note that the tool may pull a fixed distance or pull to a pre-determined force.)
7. Automatic return stroke of the drivescrew and simultaneous spin-off to release tool from the placed nut assembly. (This assembly is now positively retained in the panel and so the whole component can be handled and transported without risk of the insert moving before the adhesive is cured.)
8. Visual inspection of a flush fit of the washer outer face with the spigot top would confirm satisfactory placing.
9. The adhesive will cure to form the final fastening ready for assembly with a mating bolt or screw and other component to be attached.
10. When attaching another component in-service, the mating bolt or screw clamp load serves to clamp the washer even more firmly onto the nut shoulder, such that the lower connection strength of the interference/push-fit versus the Prior Art threaded washer is of no consequence.

The nut will normally be made of metal although other materials are feasible such as glass filled nylon. An aluminium, or other material softer than steel, could be used to form the nut, in which case the thread may be provided using a steel thread insert as a Heli-Coil ® device. The thread may be formed as a locking thread such as a Spiralock ® formation.

The above description has generally referred to attachment of a fastening to a CFRP panel or substrate. However, it will be understood that the methods and apparatus described above are applicable generally to substrate materials that are brittle or easily crushed and which therefore are unsuitable for fastenings having high clamp loads or a small area spread for the reaction load of the fastening against the substrate surface. Such materials may, for example be CFRP, glass-reinforced plastic, thermoplastics, composite materials, and materials having internal voids such as honeycomb constructions. Typically, the invention will achieve a surface area for reaction force distribution, on both sides of the substrate i.e. a blind side and front side footprint, which is greater than the cross-sectional area of the stud or threaded aperture of the fastener.

Some of the key advantages of this new fastening system are:

Simplified component design;
Easier accessibility;
Quicker assembly time;
Reduced operator skill required and less fatigue;
Reduced placing tool calibration and inspection needs; and
Reduced total cost of assembly.

The invention claimed is:

1. A threaded fastener for installation in an aperture in a workpiece, the threaded fastener including:
    a first portion and a second portion;
    the first portion including a spigot, a shoulder, and a nut head, the first portion also including a first aperture extending axially through a center of the spigot such that the spigot, the shoulder, the nut head and the first aperture share a first central axis, the shoulder being disposed below the spigot and the nut head being disposed below the shoulder, the and
    the second portion having a second aperture axially extending along a second central axis, the second aperture being of a differing diameter to that of the first aperture;
    the first and second portions having first second respective bearing surfaces so that in use first and second bearing surfaces bear on front and rear surfaces, respectively, of the workpiece;
    wherein, in use, the first and second portions engage each other in an interference fit between a wall surface defining the second aperture and a radially outer wall surface of the spigot so that the first and second central axes are collinear;
    wherein, in use, a least a portion of the radially outer wall surface passes through and extends from the aperture of the workpiece; and
    wherein an axial separation of the bearing surfaces of the first and second portions, when the first and second portions are engaged with each other, is predetermined by the axial thickness of the shoulder, the shoulder situated between the respective bearing surfaces of the first and second portions, wherein the spigot outer surface and the second aperture are non-circular.

2. The method of installing the fastener of claim 1, into a workpiece, the method comprising:
    i) placing the one of the first and second portions into an aperture in the workpiece;
    ii) fitting the other of the first and second portions to an installation tool;
    iii) engaging a drivescrew of the installation tool with the thread of the one of the first and second portions; and
    iv) axially moving the drivescrew to draw the one of the first and second portions towards the other of the first and second portions so that the two portions become engaged.

3. A method as claimed in claim 2, including applying adhesive to the workpiece prior to placing the one of the first and second portions into the workpiece aperture.

4. A threaded fastener for installation in an aperture in a workpiece, the threaded fastener including:
    a first portion and a second portion;
    the first portion including a spigot, a shoulder, and a nut head, the first portion also including a first aperture extending axially through a center of the spigot such that the spigot, the shoulder, the nut head and the first aperture share a first central axis, the shoulder being disposed below the spigot and the nut head being disposed below the shoulder, the and
    the second portion having a second aperture axially extending along a second central axis, the second aperture being of a differing diameter to that of the first aperture;
    the first and second portions having first second respective bearing surfaces so that in use first and second bearing surfaces bear on front and rear surfaces, respectively, of the workpiece;
    wherein, in use, the first and second portions engage each other in an interference fit between a wall surface defining the second aperture and a radially outer wall surface of the spigot so that the first and second central axes are collinear;
    wherein, in use, a least a portion of the radially outer wall surface passes through and extends from the aperture of the workpiece; and
    wherein an axial separation of the bearing surfaces of the first and second portions, when the first and second portions are engaged with each other, is predetermined by the axial thickness of the shoulder, the shoulder situated between the respective bearing surfaces of the first and second portions, wherein the shoulder is shrouded with an electrically non-conductive material to mitigate galvanic corrosion between the shoulder material and the workpiece material.

5. The fastener of claim 4, wherein in use, the spigot is arranged to be pressed through the aperture in the workpiece, and into the second aperture, whereby after pressing, the first and second fastener portions are held together by friction between the outer surface of the spigot and the inner surface of the second aperture.

6. The fastener of claim 4, wherein in use the shoulder has external dimensions smaller than the workpiece aperture in order to form a space between the inner edge of the workpiece aperture and the outer surface of the shoulder into which space an applied adhesive may flow.

7. The fastener of claim 4, wherein at least one of the bearing surfaces carries surface features which are arranged to grip the surface of the workpiece.

8. The fastener of claim 4, wherein the spigot outer surface carries surface features which are arranged to grip the inner surface of the second aperture in the other of the first and second portions when the first and second portions are fully engaged.

9. The fastener of claim 4, wherein the inner surface of the second aperture carries surface features which are arranged to grip the spigot outer surface when the first and second portions are fully engaged.

10. The fastener of claim 4, wherein at least one of the first and second apertures is blind.

11. A threaded fastener for installation in an aperture in a workpiece, the fastener having first and second portions, which first and second portions are arranged to engage non-removably along a common axis, the common axis defined by the aperture in the workpiece;

one of the first and second portions having an axially-extending aperture of first diameter and the other of the first and second portions having an axially-extending aperture of differing diameter to that of the one of the first and second portions; the first and second portions engaging with each other along the common axis in an interference fit between the aperture of first diameter and the aperture of differing diameter; wherein, in use, both the first and second portions have respective bearing surfaces for bearing on the front and rear surfaces, respectively, of the workpiece; wherein the axial separation of the bearing surfaces of the first and second portions, when engaged with each other, is predetermined by the axial extent (h) of at least one shoulder formed on either, or both, of the first and second portions, the at least one shoulder situated between the respective bearing surfaces of the first and second portions; and wherein the shoulder is shrouded with an electrically non-conductive material to mitigate galvanic corrosion between the shoulder material and the workpiece material.

12. A threaded fastener for installation in an aperture in a workpiece, the fastener having first and second portions, which first and second portions are arranged to engage non-removably along a common axis, the common axis defined by the aperture in the workpiece;

one of the first and second portions having an axially-extending aperture of first diameter and the other of the first and second portions having an axially-extending aperture of differing diameter to that of the one of the first and second portions; the first and second portions engaging with each other along the common axis in an interference fit between the aperture of first diameter and the aperture of differing diameter; wherein, in use, both the first and second portions have respective bearing surfaces for bearing on the front and rear surfaces, respectively, of the workpiece; wherein the axial separation of the bearing surfaces of the first and second portions, when engaged with each other, is predetermined by the axial extent (h) of at least one shoulder formed on either, or both, of the first and second portions, the at least one shoulder situated between the respective bearing surfaces of the first and second portions: and wherein the spigot outer surface and the inner surface of the axially-extending aperture in the other of the first and second portions are non-circular.

* * * * *